(12) United States Patent
Wong

(10) Patent No.: US 6,411,975 B1
(45) Date of Patent: Jun. 25, 2002

(54) DIGITAL PROCESSING

(75) Inventor: Kar Lik Wong, Berkshire (GB)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/334,297

(22) Filed: Jun. 16, 1999

(30) Foreign Application Priority Data

Jun. 19, 1998 (GB) ............................................. 9813312

(51) Int. Cl.$^7$ ................................................. G06F 7/00
(52) U.S. Cl. ....................................................... 708/207
(58) Field of Search ............................... 708/207, 525, 708/670–671; 340/146.2

(56) References Cited

U.S. PATENT DOCUMENTS 4,774,688 A * 9/1988 Kobayashi et al. ......... 708/207
4,967,349 A * 10/1990 Kodama et al. ............ 708/207
5,508,951 A    4/1996 Ishikawa .................... 364/745
5,515,306 A * 5/1996 Blaner et al. ............... 708/207
5,524,251 A * 6/1996 Urasaki ...................... 708/207
5,715,186 A    2/1998 Curtet ..................... 364/715.06
5,726,923 A * 3/1998 Okumura et al. ........... 708/207

* cited by examiner

Primary Examiner—Tan V. Mai
(74) Attorney, Agent, or Firm—Westman, Champlin & Kelly

(57) ABSTRACT

In digital processing, a method and circuit for implementing at least one of a maximum and a minimum instruction between a source operand and a destination operand in which an arithmetic operation is performed using the source and destination operands to generate a result and the storage of data in a destination storage is controlled in accordance with the sign of the source operand, the sign of the destination operand and the sign of the said result.

14 Claims, 3 Drawing Sheets

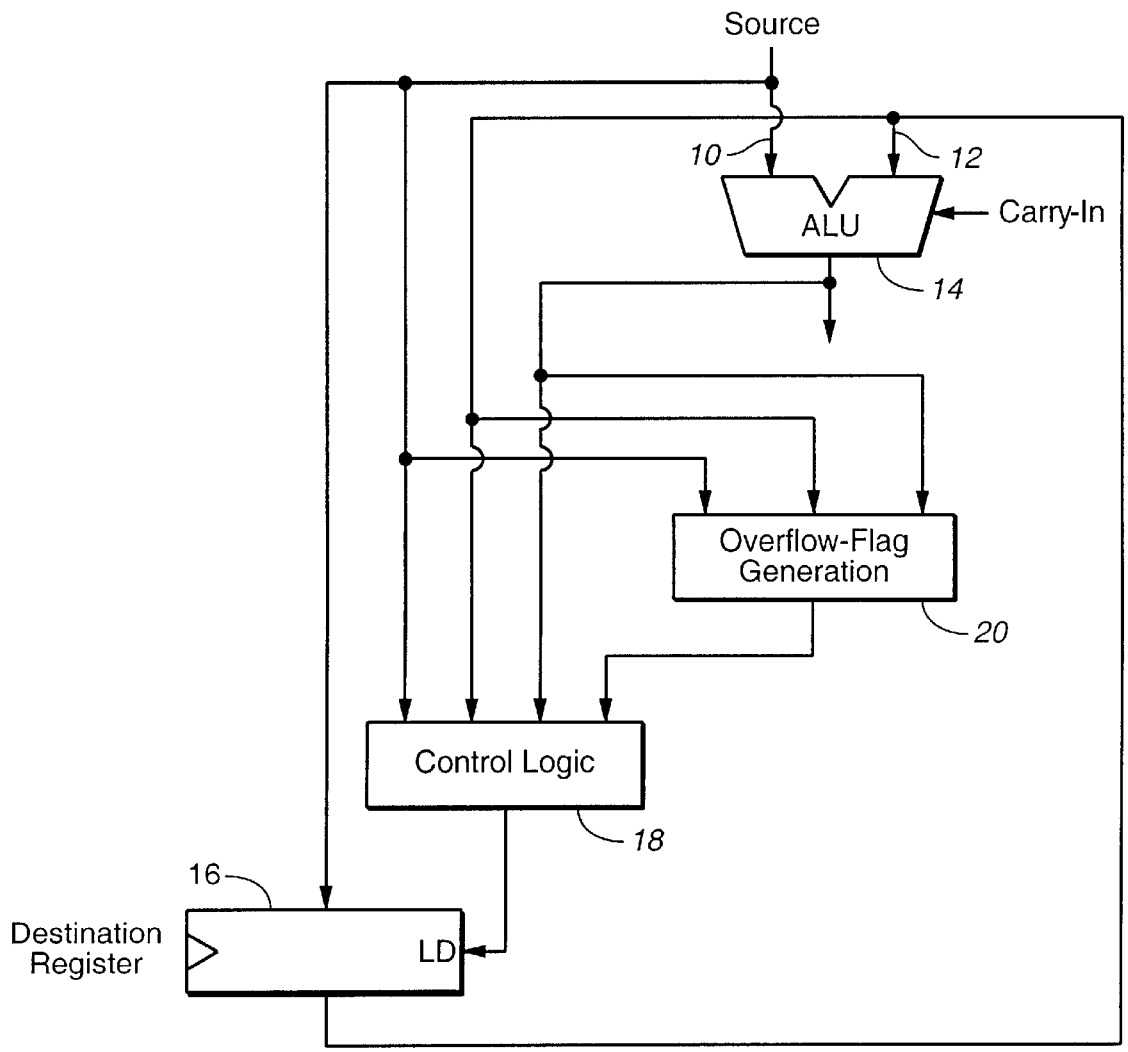
FIG._1

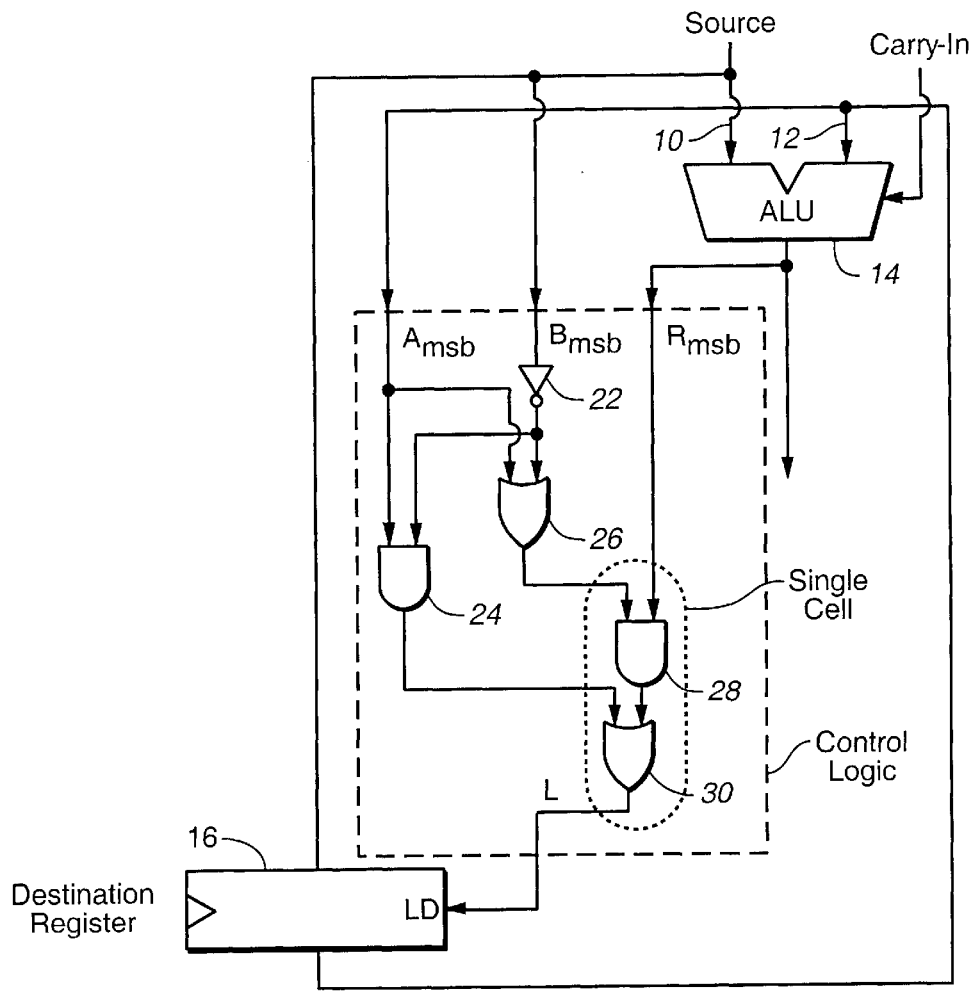
FIG._2
| A<sub>msb</sub> | B<sub>msb</sub> | R<sub>msb</sub> | L |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 0 |
| 1 | 1 | 1 | 1 |
Table1: Truth Table Of Function L
FIG._4

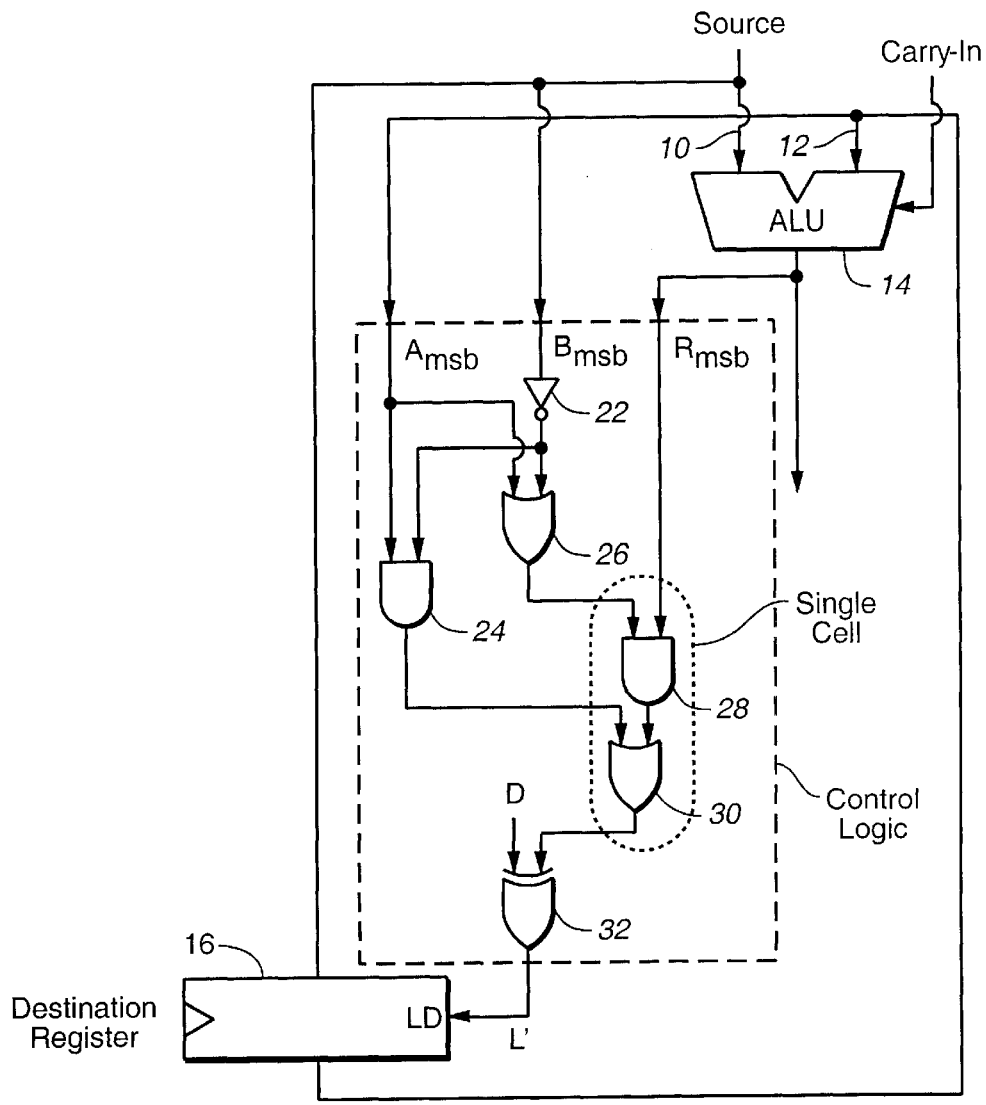
FIG._3
| ALU Carry-In | D | (L' = 1) Equivalent to |
|---|---|---|
| 0 | 0 | A < B |
| 0 | 1 | A ≥ B |
| 1 | 0 | A ≤ B |
| 1 | 1 | A > B |
Table 2: Conditions Detect By L'
FIG._5

DIGITAL PROCESSING

BACKGROUND OF THE INVENTION

The present invention relates to digital processing in general and in particular the implementation of functions such as maximum and minimum detection and storage.

The conventional circuitry and method for implementing maximum and minimum type instructions is illustrated in FIG. 1 of the accompanying drawings. A source operand is applied to one input (10) of an arithmetic logic unit (14) and an existing destination operand is applied to the other input (12) of the arithmetic logic unit. The destination operand is stored in a destination register 16. Subtraction of the destination operand from the source operand is performed by the arithmetic logic unit. The difference and the generated status are used by a control logic unit (18) which determines whether the loading of the source operand in to the destination register (16) should be enabled. The control logic unit (18) can determine that the destination operand is greater than the source operand when the result of the subtraction, the difference, is negative. This, however, is dependent upon there having been no overflow during the subtraction operation. If overflow has occurred then it is necessary to assess the most significant bits of the operands, as input in to the arithmetic logic unit, in order to determine which operand is greater. Thus, a vital part of the conventional circuit is the overflow-flag generation unit (20). Detection of the overflow condition is an integral part of conventional digital processors and forms part of the overall processor status generation hardware.

The conventional method and circuit, as illustrated in FIG. 1, is slowed by the need to detect whether or not overflow has occurred during subtraction. Additionally, it is common for conventional processors also to detect "greater-than-or-equals-to" and "less-than-or-equals-to" conditions rather than simple maximum or minimum conditions. This requires additional circuit elements, which further adds to the delay introduced by the overall circuit. Such delays can have a significant impact on the operation of a well balanced high performance processor.

SUMMARY OF THE INVENTION

According to a first aspect of the present invention there is provided a digital processor comprising an arithmetic unit, a control logic unit and a destination storage unit, the processor being capable of implementing at least one of a maximum and a minimum instruction between a source operand and a destination operand; the arithmetic unit having respective inputs for receiving the source and destination operands and an output for outputting the result of an arithmetic operation performed using the source and destination operands; the control logic unit being connected between the arithmetic unit output and the destination storage unit and operatively controlling storage of data in the destination storage unit, wherein the control logic unit is operatively controlled by the sign of the source operand, the sign of the destination operand and the sign of the result.

According to a second aspect of the present invention there is provided a method of digital processing including implementing at least one of a maximum and a minimum instruction between a source operand and a destination operand comprising performing an arithmetic operation using the source and destination operands to generate a result; and controlling storage of data in the destination storage means in accordance with the sign of the source operand, the sign of the destination operand and the sign of the said result.

BRIEF DESCRIPTION OF THE DRAWINGS

Embodiments of the present invention will now be described by way of example only and with reference to the accompanying drawings, in which:

FIG. 1 illustrates a conventional circuit and method for implementing a maximum/minimum instruction in a digital processor, FIG. 2 illustrates a circuit and method for implementing a maximum/minimum instruction in a digital processor, in accordance with a first embodiment of the present invention, FIG. 3 illustrates a circuit and method for implementing a maximum/minimum instruction in a digital processor, in accordance with a second embodiment of the present invention, FIG. 4 is a truth table useful in explaining operation of an embodiment of the present invention, and FIG. 5 is another truth table useful in explaining operation of an embodiment of the present invention.

DETAILED DESCRIPTION OF ILLUSTRATIVE EMBODIMENTS

The same reference numerals are used in FIGS. 2 and 3 for components which generally correspond to the same components as in FIG. 1.

As will be immediately apparent from a comparison of FIGS. 1 and 2, the present invention avoids the use of the overflow-flag generation unit which is an essential component of the conventional arrangement. Thus, the present invention provides for the fast implementation of maximum/minimum instructions and the circuit and method illustrated by FIG. 2 have the capability of dealing with situations when overflow occurs in the arithmetic logic unit 14. As will be described, the circuit and method illustrated in FIG. 2 are also capable of handling "greater-than-or-equals-to" and "less-than-or-equals-to" conditions as well as simple maximum or minimum conditions.

The control logic unit illustrated in FIG. 2 comprises an inverter (22), two logical AND gates (24, 28) and two logical OR gates (26, 30), has three inputs and an output which controls storage in to the destination register. The inputs are the most significant bit of the source operand, the most significant bit of the destination operand and the most significant bit of the result output by the arithmetic unit. As stated above, in the conventional arrangement, if overflow has occurred then it is necessary to assess the most significant bits of the operands input into the arithmetic logic unit in order to determine which operand is greater. The embodiment of FIG. 2 avoids the conventional use of an overflow-flag generation unit by always operating on the most significant bits of the source and destination operands and, additionally, the most significant bit of the result generated by the arithmetic unit. As is apparent from FIG. 2, the result is a remarkably simple circuit and avoidance of the conventional delays introduced by the overflow detection.

The most significant bit for each of the source operand, destination operand and the result from the arithmetic unit defines the sign of the respective value. In FIG. 2 the most significant bit of the source operand is referenced $A_{msb}$, the most significant bit of the destination operand is referenced $B_{msb}$, and the most significant bit of the result from the arithmetic unit is referenced $R_{msb}$.

$B_{msb}$ is applied to inverter 22 and the output of the inverter is input to AND gate 24 together with $A_{msb}$. $A_{msb}$ and the inverted $B_{msb}$ ($\overline{B}_{msb}$) are also applied as respective inputs to OR gate 26. The output of OR gate 26 is applied as one input of AND gate 28 and $R_{msb}$ is applied as the other input thereof. The outputs of AND gates 24 and 28 are applied as respective inputs of OR gate 30. The output of OR gate 30 is referenced L in FIG. 2 and it is this output which controls the loading of the source operand into the destination register 16.

FIG. 4 shows the truth table for L. The top two rows and the bottom two rows of the truth table represent the cases when A and B are of the same sign. In these cases overflow can not occur when performing the subtraction A−B. Thus, in these cases it is sufficient to determine if A is less than B based only on the sign of the result of the subtraction, ie on $R_{msb}$. When R is negative, $R_{msb}=1$, A is obviously less than B. It will also be apparent that $L=R_{msb}$ when $A_{msb}=B_{msb}$.

The middle four rows of the truth table represent the cases when A and B are of different sign. In these cases it can not be determined if A is less than B by inspecting $R_{msb}$ alone since A−B can result in an overflow within the arithmetic unit 14. However, it has been recognised that the decision can be made by inspecting whether or not A is negative. If it is, B must be non-negative since $A_{msb}$ is not equal to $B_{msb}$. A non-negative number is always greater than a negative number. Thus, from the control logic circuit of FIG. 2, $L=A_{msb}$ when $A_{msb}$ is not equal to $B_{msb}$. In summary of the middle four rows of the truth table, L=1 when A is less than B.

From the above, it will be apparent that if the source operand and the destination operand are respectively applied to the B and A inputs of the arithmetic unit, the circuit of FIG. 2 implements a "MAX source, destination" instruction, in which destination is loaded with source, if destination is less than source. The circuit will implement the "MIN source, destination" instruction when the two operands to the arithmetic unit are swapped.

As will be appreciated from FIG. 2, the paths from $A_{msb}$ and $B_{msb}$ to L do not add to the ALU path, which is often a critical path within the processor. The path from $R_{msb}$ to L does add to the ALU path but this addition consists only of an AND gate and an OR gate. Most ranges of semiconductor devices, or so called cell libraries, have a single AND-OR gate which implements the required function. The practical realisation, ie a single cell, is illustrated in FIG. 2 by the chain line portion of the control logic unit. The effect is that the circuit of FIG. 2 adds only one gate delay in the ALU path.

As mentioned above, it is sometimes required to implement "greater-than-or-equals-to" and "less-than-or-equals-to" conditions rather than simple maximum or minimum conditions. In such cases the instructions not only perform conditional loading of the source in to the destination register but also set one or more status flags to indicate that equivalence between A and B has occurred. As indicated in FIG. 1 (and 2) the arithmetic unit 14 is provided with a carry-in function. In the circuit of FIG. 2 this carry-in function can be used to enable equivalence detection without the addition of any further components. This is achieved by forcing the carry-in to 1, as will now be explained.

First, the circuit of FIG. 2 can be represented by the equation $$L=A_{msb} \cdot \overline{B}_{msb}+(A_{msb}+\overline{B}_{msb}) \cdot R_{msb} \tag{1}$$

where $\overline{B}_{msb}$ is the 1's complement of $B_{msb}$,
+ denotes the logical OR operation,
· denotes the logical AND operation From this and the above discussion of $L=R_{msb}$ when $A_{msb}=B_{msb}$ it is derived that $$A<B \Leftrightarrow R_{msb}=1 \Leftrightarrow L=1 \text{ when } A_{msb}=Bmsb \tag{2}$$

Again, from (1) and the above discussion, of $L=A_{msb}$ when $A_{msb} \neq B_{msb}$ it is derived that $$A<B \Leftrightarrow A_{msb}=1 \Leftrightarrow L=1 \text{ when } A_{msb} \neq Bmsb \tag{3}$$

From (2) and (3) it is determined that $$A<B \Leftrightarrow L=1 \tag{4}$$

Thus, when the carry-in is 1, the result R of the ALU becomes $$R=A-B-1=A-(B+1)=A-B' \tag{5}$$

where $B'=(B+1)$.
We first consider $B \neq -1$. When that is true, B' has the same sign as B, i.e.

$$B'_{msb}=B_{msb} \text{ when } B \neq -1 \tag{6}$$

Substituting equation (6) into equation (1), we have $$L=A_{msb} \cdot \overline{B'}_{msb}+(A_{msb}+\overline{B'}_{msb}) \cdot R_{msb} \text{ when } B \neq -1 \tag{7}$$

Equation (4) then becomes $$L=1 \Leftrightarrow A<B' \Leftrightarrow A<B+1 \Leftrightarrow A \leq B \text{ when } B \neq -1 \tag{8}$$

Next, we consider $B=-1$. Here, we have $B'_{msb}=0$.
Also $R=A-(B+1)=A-(-1+1)=A$, which implies $A_{msb}=R_{msb}$. These two conditions turn equation (1) into $$L=A_{msb} \text{ when } B=-1 \tag{9}$$

When $A_{msb}=1$, A is negative which is clearly less than or equals to $B=-1$.
Otherwise, A is non-negative and is greater than B. Therefore $$L=A_{msb}=1 \Leftrightarrow A \leq B \text{ when } B=-1 \tag{10}$$

Combining equations (8) and (10), we have shown that $$L=1 \Leftrightarrow A \leq B \text{ when carry-in of ALU is forced to 1} \tag{11}$$

Similarly, $A \geq B$ can be detected using the same function by swapping the inputs to the ALU. That is to say, the circuit shown in FIG. 2 detects the greater-than or less-than conditions when the carry-in bit is 0. It detects the greater-than-or-equals-to or less-than-or-equals-to conditions when the carry-in bit is 1. Since most processors have the facility to force the carry-in bit to a particular value, no extra overhead is added in order to detect all four type of conditions.

The notation $B'=(B+1)$ is purely conceptual. Internal to the ALU, equation (5) is implemented as $R=(A+\overline{B})$.

In the above, it has been assumed that the inputs to the ALU can be freely swapped so that the circuit in FIG. 2 can implement both MAX and MIN instructions. That might not be true, especially in accumulator based machines. If that is the case, MAX and MIN instructions can still be implemented with the same circuit if the value of L is optionally inverted. This is because $A \geq B \Leftrightarrow \overline{(A<B)}$ and $A>B \Leftrightarrow \overline{(A \leq B)}$. That is, L needs to be extended as follows $$L'=(A_{msb} \cdot \overline{B}_{msb}+(A_{msb}+\overline{B}_{msb}) \cdot R_{msb}) \oplus D \tag{12}$$

where $\oplus$ denotes the logical EXclusive-OR operation.

FIG. 3 illustrates a method and circuit which implement the arrangement defined by equation (12). The circuit of FIG. 3 differs from that of FIG. 2 by the inclusion in the control logic of an EXclusive-OR gate 32. The EX-OR gate 32 receives on one input the output from OR gate 30 and on the other input the operator D. Operator D is simply an inverting function which eliminates the need to swap the ALU inputs when implementing certain Max/Min instructions. The output of EX-OR 32 is the control L'. The Table of FIG. 5 summaries the conditions detected when L'=1.

Whereas the circuit shown in FIG. 2 adds only one gate delay to the ALU path, the circuit implementing equation (12), which is extended for accumulator based machines, only adds two gate delays—as can be seen from FIG. 3. Thus high performance processors can use either of these functions to implement Max/Min type instructions while minimising the impact on performance.

Either of the simple logic functions in equations (1) and (12) can detect all the four conditions: greater-than, less-than, greater-than-or-equals-to and less-than-or-equals-to. For the function in equation (1), this is controlled by manipulating the carry-in bit and by assigning the appropriate operands to the ALU inputs. These are existing facilities for most processors. For the function in equation (12), the additional control D requires only minimal extra hardware resources to cater for processors with limited flexibility in assigning operands to the ALU input.

What is claimed is:

1. A digital processor comprising an arithmetic unit, a control logic unit and a destination storage unit, the processor being capable of implementing at least one of a maximum and a minimum instruction between a source operand and a destination operand; the arithmetic unit having respective inputs for receiving the source and destination operands and an output for outputting the result of an arithmetic operation performed using the source and destination operands; the control logic unit being connected between the arithmetic unit output and the destination storage unit and operatively controlling storage of data in the destination storage unit, wherein the control logic unit is operatively controlled by the sign of the source operand, the sign of the destination operand and the sign of the result.

2. A digital processor as claimed in claim 1, wherein the control logic unit is adapted to generate an output dependent upon the sign of the result when the sign of the source operand is the same as the sign of the destination operand and dependent upon the sign of the source operand when the sign of the source operand and the sign of the destination operand are not the same.

3. A digital processor as claimed in claim 1, wherein the control logic unit is adapted to generate an output dependent upon the sign of the result when the sign of the source operand is the same as the sign of the destination operand and dependent upon the sign of the destination operand when the sign of the source operand and the sign of the destination operand are not the same.

4. A digital processor as claimed in claim 1, wherein the control logic unit comprises an inverter which inverts the most significant bit of the destination operand input thereto.

5. A digital processor of claim 4, wherein the control logic unit further comprises a first logical AND gate, and a second logical AND gate, a first logical OR gate and a second logical OR gate with the first AND gate being connected to receive on one input the most significant bit of the source operand and to receive on another input an output of the inverter, the first OR gate being connected to receive on one input the most significant bit of the source operand and to receive on another input the output of the inverter, the second AND gate being connected to receive on one input an output of the first OR gate and to receive on another input the most significant bit of the result, and the second OR gate being connected to receive on respective inputs the outputs of the two AND gates so as to output a signal which controls storage of data in the destination storage unit.

6. A digital processor as claimed in claim 5, wherein the second AND gate and the second OR gate are implemented as a single AND-OR gate.

7. A digital processor as claimed in claim 1, wherein the control logic unit comprises as its final output stage a logical EXclusive-OR gate.

8. A method of digital processing including implementing at least one of a maximum and a minimum instruction between a source operand and a destination operand comprising performing an arithmetic operation using the source and destination operands to generate a result; and controlling storage of data in the destination storage means in accordance with the sign of the source operand, the sign of the destination operand and the sign of the said result.

9. A method of digital processing as claimed in claim 8, further comprising the step of generating an output dependent upon the sign of the said result when the sign of the source operand is the same as the sign of the destination operand and dependent upon the sign of the source operand when the sign of the source operand and the sign of the destination operand are not the same.

10. A method of digital processing as claimed in claim 8, further comprising the step of generating an output dependent upon the sign of the said result when the sign of the source operand is the same as the sign of the destination operand and dependent upon the sign of the destination operand when the sign of the source operand and the sign of the destination operand are not the same.

11. A method of digital processing as claimed in claim 8, further comprising the step of inverting the most significant bit of the destination operand.

12. A method of digital processing as claimed in claim 8, wherein the step of controlling storage of data comprises the steps of performing two logical AND operations and two logical OR operations.

13. A method of digital processing as claimed in claim 12, further comprising the step of implementing one of the logical AND operations and one of the logical OR operations as a single AND-OR operation.

14. A method of digital processing as claimed in claim 8, further comprising the step of performing a logical EXclusive-OR operation.

* * * * *